United States Patent [19]

Givens

[11] 4,379,229
[45] Apr. 5, 1983

[54] MEASURING OF GAMMA-RAY ENERGY DUE TO THERMAL NEUTRON CAPTURE OF COPPER AND NICKEL

[75] Inventor: Wyatt W. Givens, Dallas, Tex.
[73] Assignee: Mobil Oil Corporation, New York, N.Y.
[21] Appl. No.: 221,481
[22] Filed: Dec. 30, 1980
[51] Int. Cl.³ .............................................. G01V 5/00
[52] U.S. Cl. ..................................... 250/270; 250/269
[58] Field of Search ................. 250/269, 270; 376/162

[56] References Cited

U.S. PATENT DOCUMENTS

| | | | |
|---|---|---|---|
| 3,521,064 | 7/1970 | Moran et al. | 250/269 |
| 3,662,173 | 5/1972 | Youmans | 250/270 |
| 3,792,253 | 2/1974 | Wylie et al. | 250/270 |
| 3,825,753 | 7/1974 | Givens | 376/162 |
| 3,940,610 | 2/1976 | Dennis et al. | 250/253 |

Primary Examiner—Bruce C. Anderson
Attorney, Agent, or Firm—Charles A. Huggett; Michael G. Gilman; George W. Hager

[57] ABSTRACT

A source of fast neutrons is pulsed to irradiate the formations surrounding a borehole with neutrons to produce gamma-rays from thermal neutron capture of the metallic materials located within the formations. Such gamma-rays are detected as an indication of the presence of such materials within the formations.

6 Claims, 3 Drawing Figures

MEASURING OF GAMMA-RAY ENERGY DUE TO THERMAL NEUTRON CAPTURE OF COPPER AND NICKEL

BACKGROUND OF THE INVENTION

A number of methods are known and have been made commercially available in the well logging art for studying the radioactive properties of earth formation, both where the radioactivity is natural and where it is artificially induced. Logs of such properties aid immeasurably in the study of the nature of the subsurface formation, particularly in exploration for mineral or petroleum deposits of such quantities as to make them commercially inviting. One such method relates to the analysis of the energy spectrum of gamma radiation artificially produced in formations adjacent a borehole

SUMMARY OF THE INVENTION

In accordance with the present invention, a metallic material bearing formation traversed by a borehole is irradiated with neutrons of sufficient energy to produce gamma-rays from thermal neutron capture of the metallic material in the formation. Such gamma-rays are measured as an indication of the presence of the metallic materials in the formation.

In one embodiment of the invention, gamma-rays are detected within energy bands which primarily identify the concentrations of copper and nickel within the formations.

DESCRIPTION OF THE PREFERRED EMBODIMENT

Figure 1:
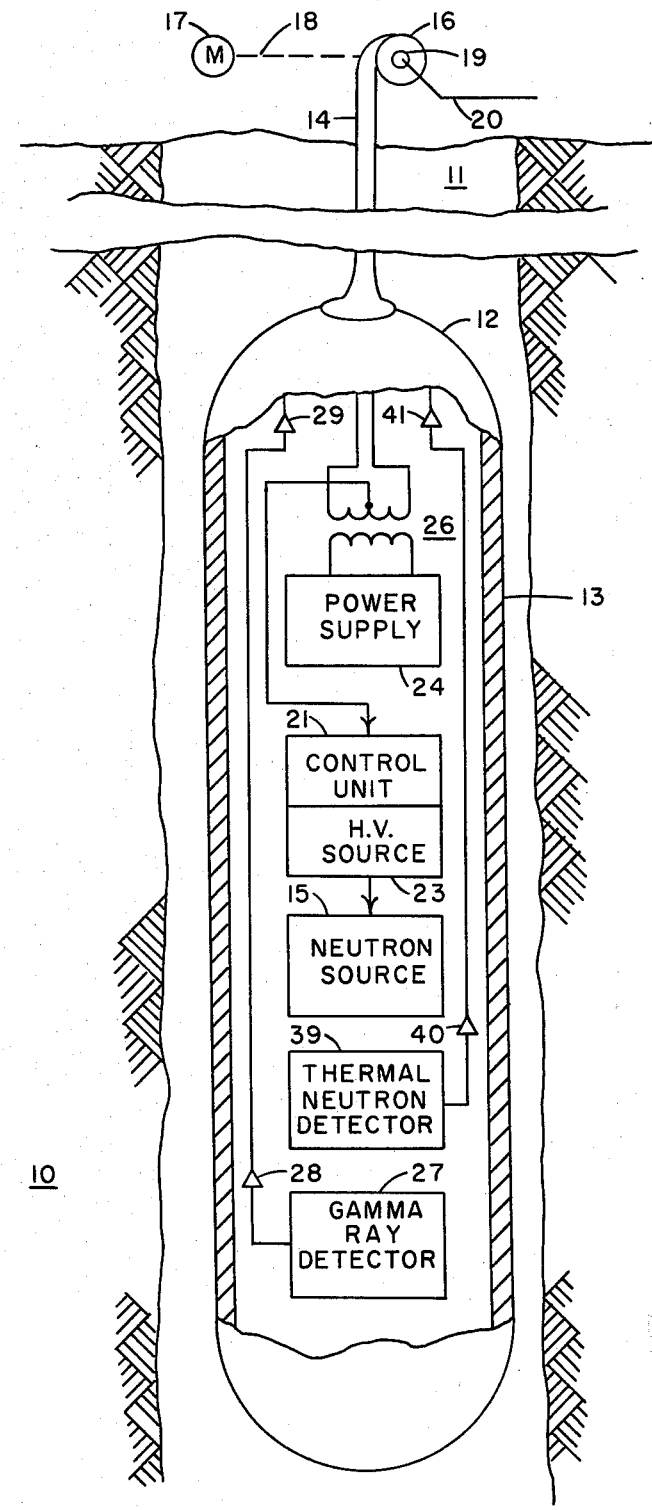
FIG. 1 illustrates the gamma radiation borehole logging system of the present invention.
Figure 2:
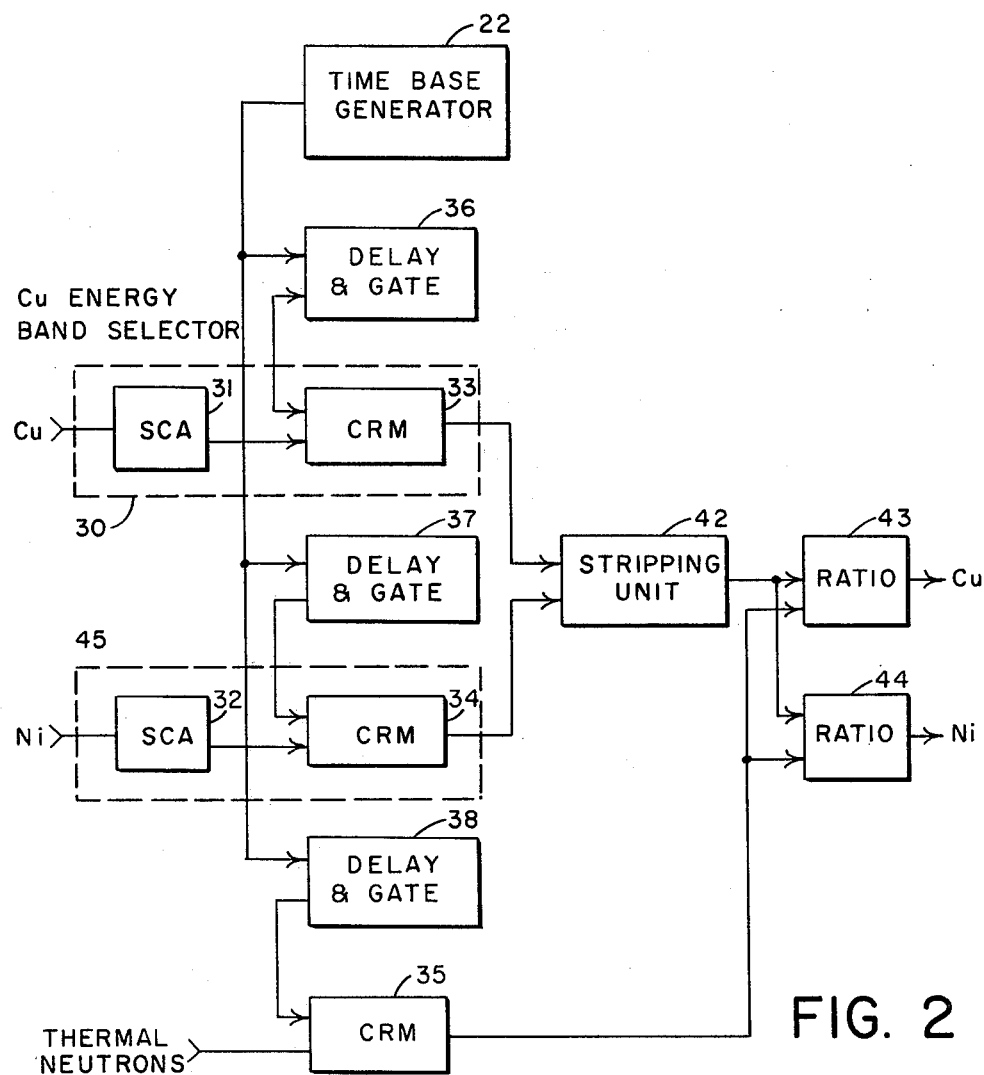
FIG. 2 is an electrical schematic of the uphole recording equipment for use in processing the gamma radiation measurements carried out by the borehole logging system of FIG. 1.

Referring to FIG. 1, there is illustrated a borehole assay tool and recording system for carrying out the logging operation of the present invention. The formation to be investigated or assayed is shown at 10. It is traversed by a borehole 11. Assaying is carried out by lowering the assay tool 12 into the borehole to the level of the formation 10. The assay tool 12 comprises a housing 13 which is suspended in the borehole 11 by means of a logging cable 14 and in which the neutron source 15, the thermal neutron detector 38 and the gamma-ray detector 27 are located. The cable 14 is driven from the drum 16 by the motor 17 and the connection 18. Slip rings 19 and brushes 20 are employed to couple the conductors of cable 14 to the uphole recording system of FIG. 2 for the transmission of signals and voltages.

Figure 3:
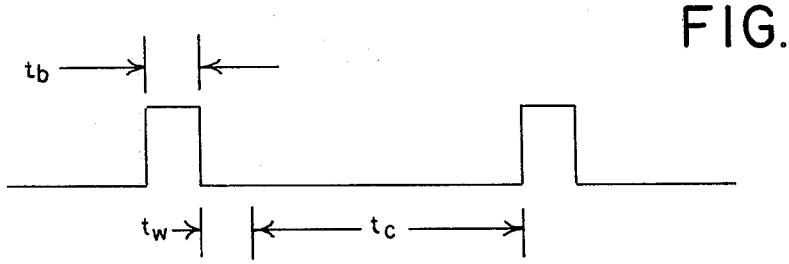
FIG. 3 is a timing diagram representative of the cyclical operation of the borehole logging system of FIG. 1.

It is a specific feature of the present invention to identify those gamma-rays emitted from formations surrounding the borehole in response to thermal neutron-capture in select, metallic materials within such formation. To carry out this feature, the source 15 is operated at about 400 to 1000 bursts per second, each burst having a duration of about 20 to 100 microseconds as illustrated by the period $t_b$ in FIG. 3. A waiting period $t_w$ follows each neutron burst to allow the 14 MEV neutrons from the source to die away to thermal level of about 0.025 MEV. A sufficient waiting period $t_w$ has been found to be 50 to 100 microseconds. During the remaining time period $t_c$ before the next neutron burst the number of neutrons counted by the neutron detector 39 and the number of gamma-rays counted by the gamma-ray detector 27 are counted by the uphole system.

In one embodiment, the neutron source 14 is a high energy deuterium-tritium source producing neutrons of about 14 MEV. Pulsing of the neutron source 14 is carried out in response to a trigger pulse supplied by the uphole system. More particularly, a control unit 21, in response to pulses from an uphole time base generator 22, controls the application of high voltage pulses to the ion source of a neutron tube in the neutron source 15. High voltage source 23 provides a d.c. voltage to the target of the neutron tube.

Power for the remaining electronics of the assay tool is supplied by the downhole power source 24. Power to this downhole source is supplied from the uphole power source 25 (not shown) by way of the downhole transformer 26. For simplicity, connection is not shown between the downhole power source 24 and the other downhole electronics.

Thermal neutron detector 39 may comprise a plurality of helium-3 detectors. The output of the detector is applied uphole by means of preamplifier 40 and amplifier 41 to the count rate meter 42 of FIG. 2. The gamma-ray detector 27 is preferably an NaI scintillation crystal coupled to a photomultiplier tube which is utilized to measure the gamma-rays emitted from the surrounding borehole formation 10 when irradiated with neutrons from the 14 MEV neutron source 15. The output of gamma-ray detector 27 is applied uphole by means of a preamplifier 28 and amplifier 29 to the copper and nickel energy band selectors 30 and 45. Energy band selector 30 includes the single channel analyzer 31 and count rate meter 33. Energy band selector 45 includes the single channel analyzer 32 and count rate meter 34.

Delay and gate generators 36–38 provide gating pulses for the duration of the counting period $t_c$. These gating pulses are applied to the count rate meters 33–35. Count rate meters 33 and 34 provide for the counting of those gamma-rays applied to the count rate meters from the single-channel analyzers 31 and 32 respectively. Each of the single-channel analyzers is biased to be selectively responsive to a gamma-ray from a select one of the desired metallic materials in the formation surrounding the borehole. The single-channel analyzer 31 provides a window set around pulse heights produced by gamma-rays having energies of 6.5 to 8.2 MEV which is a characteristic energy band centered about the energy levels at which copper exhibits peak gamma radiation intensities as a result of thermal neutron capture of the copper in the formation. Single-channel analyzer 32 provides a window set around pulse heights produced by gamma-rays having energies of 8.2 to 9.2 MEV, which is a characteristic band centered about the energy levels at which nickel exhibits peak gamma radiation intensities as a result of thermal neutron capture of the nickel in the formation. The outputs of the count rate meters 33 and 34 therefore provide a gross qualitative indication of the copper and nickel components respectively of the metallic materials surrounding the borehole.

As noted previously, the single-channel analyzers 31 and 32 discriminate the gamma-ray signals from the gamma-ray detector 27 into copper and nickel energy band signals centered about the energy levels at which copper and nickel exhibit peak gamma radiation intensities. However, the higher energy gamma radiation of nickel may influence the lower energy gamma radiation of copper. It is, therefore, a further aspect of the invention to apply the copper and nickel measurements to a stripping unit 42 which strips the copper gamma radiation measurement, as represented by the copper energy band signals from single-channel analyzer 31, of any influence from the nickel gamma radiation. Similarly, the nickel gamma radiation measurement, as represented by the nickel energy band signal from the single-channel analyzer 32 of any influence from the copper gamma radiation. One such suitable stripping unit for radioactive measurements is described in U.S. Pat. No. 3,940,610 to Dennis et al and reference may be made to such patent for a more detailed description of the configuration and operation of such a stripping unit.

The copper and nickel output signals from the stripping unit 42 are applied to the ratio detectors 43 and 44 respectively. The other input to these ratio detectors is the thermal neutron count from count rate meter 35. These ratio detectors compensate the copper and nickel gamma-ray counts for variations in the intensity of the neutron source 15 during each of the neutron burst periods. Consequently, the output of ratio detector 43 is a quantitative indication of the copper content of the formation and the output of ratio detector 44 is a quantitative indication of the nickel content of the formation.

The outputs of ratio detectors 43 and 44 also provide for elemental compensation for nickel and copper. In similar fashion to the ratio of epithermal to thermal neutron count rates for uranium-235 disclosed in U.S. Pat. No. 4,180,730 to W. W. Givens et al, the ratio of gamma-ray to thermal neutron count rates for copper and nickel can be represented by the expression:

$$C_{gamma}/C_{thermal} = N_{(Cu/Ni)} K \quad (1)$$

where:
$C_{gamma}$ = gamma-ray count,
$C_{thermal}$ = thermal neutron count,
$N_{(Cu/Ni)}$ = number of copper or nickel atoms per cubic centimeter, and
K = constant For a more detailed understanding of such elemental compensation, reference may be made to U.S. Pat. No. 4,180,730.

Preferably the ratio detectors 43 and 44 include at least one operational amplifier with feedback and biasing resistors selected to produce the desired quantitative metallic content of the formation in response to neutron source variation.

As noted previously, the gamma-ray detector 27 is preferably a NaI scintillation crystal. The energy resolution of such a scintillation crystal type radiation detector is, however, not as sharp as the energy resolution provided by a germanium semiconductor radiation detector. In an alternative embodiment, a germanium radiation detector may be employed along with a narrowing the window of the Cu and Ni energy band selectors 30 and 45 respectively so as to achieve greater Cu and Ni energy resolutions. For example, while nickel energy band selector 32 employs an energy window of 8.2 to 9.2 MEV for use with the NaI scintillation crystal detector 27, a much narrower Ni energy window may be centered about one of the more intense of the nickel energy peaks within the 8.2 to 9.2 MEV range if a germanium radiation detector is employed. Such peaks typically occur at about 8.488 MEV and 8.999 MEV.

Similarly, a more narrow Cu energy window may be centered about one of the more intense of the copper energy peaks within the 6.5 to 8.2 MEV range if a germanium radiation detector is employed. Such peaks typically occur at about 6.893 MEV, 7.404 MEV and 7.915 MEV. It can therefore be seen that use of the germanium radiation detector would eliminate the need for the stripping unit 42.

Various other modifications to the disclosed embodiment, as well as alternate embodiments, may become apparent to one skilled in the art without departing from the scope and spirit of the invention as hereinafter defined by the appended claims.

What is claimed is:

1. The method of determining concentrations of a selected element of metallic material in formations adjacent a borehole which comprises:
    (a) irradiating the formations surrounding the borehole with neutrons having energies sufficient to excite thermal neutron capture in select metallic materials within said formations,
    (b) detecting gamma-rays emitted from the formations in response to thermal neutron capture and within an energy band which lies within the limits of from about 6.5 MEV to 8.2 MEV thereby to produce a record primarily dependent upon the concentration of copper in said formation.

2. The method of determining concentrations of a selected element of metallic material in formations adjacent a borehole which comprises:
    (a) irradiating the formations surrounding the borehole with neutrons having energies sufficient to excite thermal neutron capture in select metallic materials within said formations,
    (b) detecting gamma-rays emitted from the formations in response to thermal neutron capture and within an energy band which lies within the limits of from about 8.2 MEV to 9.2 MEV thereby to produce a record primarily dependent upon the concentration of nickel in said formation.

3. The method of claim 1 wherein said formations are irradiated with neutrons having a burst rate in the order of 900 to 1000 bursts per second and a burst duration of about 20 to 100 microseconds.

4. The method of claim 2 wherein said formations are irradiated with neutrons having a burst rate of 900 to 1000 bursts per second and a burst duration of about 20 to 100 microseconds.

5. The method of determining concentrations of a selected element of metallic material in formations adjacent a borehole which comprises:
    (a) irradiating the formations surrounding the borehole with neutrons from a fast neutron source having energies sufficient to excite thermal neutron capture in select metallic materials within said formations,
    (b) detecting and counting gamma-rays emitted from the formations in response to thermal neutron capture from said select metallic materials,
    (c) detecting and counting fast neutrons directly from said fast neutron source and
    (d) determining the ratio of the count of fast neutrons with the count of gamma-rays for each select metallic material to compensate said count of gamma-rays for variations in the output of said fast neutron source and thereby provide a quantitative indication of the metallic material content within the formations surrounding the borehole.

6. The method of claim 5 wherein said ratio is determined in accordance with the following:

$$C_{gamma}/C_{thermal} = N_{(Cu/Ni)} K$$

where:
$C_{gamma}$ = gamma-ray count,
$C_{thermal}$ = thermal neutron count,
$N_{(Cu/Ni)}$ = number of copper or nickel atoms per cubic centimeter, and
K = constant.

* * * * *

UNITED STATES PATENT AND TRADEMARK OFFICE
CERTIFICATE OF CORRECTION

PATENT NO. : 4,379,229
DATED : April 5, 1983
INVENTOR(S) : Wyatt W. Givens

It is certified that error appears in the above-identified patent and that said Letters Patent is hereby corrected as shown below:

ON THE TITLE PAGE, and Column 1, title of invention should read -- MEASUREMENT OF GAMMA-RAY ENERGY DUE TO THERMAL NEUTRON CAPTURE OF COPPER AND NICKEL --.

Signed and Sealed this

Twenty-seventh Day of September 1983

[SEAL]

Attest:

GERALD J. MOSSINGHOFF

Attesting Officer

Commissioner of Patents and Trademarks